United States Patent [19]

Bras, Johan C. M. et al.

[11] Patent Number: 5,100,159
[45] Date of Patent: Mar. 31, 1992

[54] SEALING AND FRICTION BEARING UNIT CONTAINING A MAGNETIC FLUID

[75] Inventors: Bras, Johan C. M., Tricht; Vedran A. Tadi, Culemborg, both of Netherlands

[73] Assignee: SKF Industrial Trading & Development Co. B.V., Nieuwegein, Netherlands

[21] Appl. No.: 561,106

[22] Filed: Aug. 1, 1990

[30] Foreign Application Priority Data

Aug. 17, 1989 [NL] Netherlands ............... 8902086

[51] Int. Cl.⁵ ............................................. F16J 15/40
[52] U.S. Cl. ........................................ 277/80; 277/135
[58] Field of Search .............. 277/80, 135; 384/133

[56] References Cited

U.S. PATENT DOCUMENTS

| 4,526,380 | 7/1985 | Raj et al. | 277/80 |
|---|---|---|---|
| 4,526,381 | 7/1985 | Ezekiel | 277/80 |
| 4,605,233 | 8/1986 | Sato | 277/80 |
| 4,628,384 | 12/1986 | Ray et al. | 277/80 |
| 4,708,350 | 11/1987 | Mizumoto et al. | 277/80 |
| 4,830,384 | 5/1989 | Raj et al. | 277/80 |

FOREIGN PATENT DOCUMENTS

| 0182656 | 5/1986 | European Pat. Off. |  |
|---|---|---|---|
| 0219965 | 9/1988 | Japan | 277/80 |
| 00654868 | 3/1989 | Japan | 277/80 |
| 0651159 | 3/1979 | U.S.S.R. | 277/80 |

Primary Examiner—William A. Cuchlinski, Jr.
Assistant Examiner—Daniel G. DePumpo
Attorney, Agent, or Firm—Eugene E. Renz, Jr.

[57] ABSTRACT

A device for holding an amount of magnetic fluid by means of a magnetic field inside a gap-shaped space located around a rotatable shaft, including a unit consisting of an annular pole piece whose inner circumferential plane is located at a relatively short distance from the shaft. The device has at least one annular permanent magnet for generating the magnetic field, whereby the magnetic fluid is kept inside the gap-shaped space between this unit and the shaft. The invention is characterized by the fact that the pole piece (3, 14) is located between two annular permanent magnets (1, 2; 12, 13), whereby the analogous poles of these magnets are directed at each other and the inner circumferential planes of the two magnets are located essential equidistance from the shaft (4, 11) in order to form, together with the shaft, two annular spaces which are located on both sides of an annular intermediate gap.

2 Claims, 4 Drawing Sheets

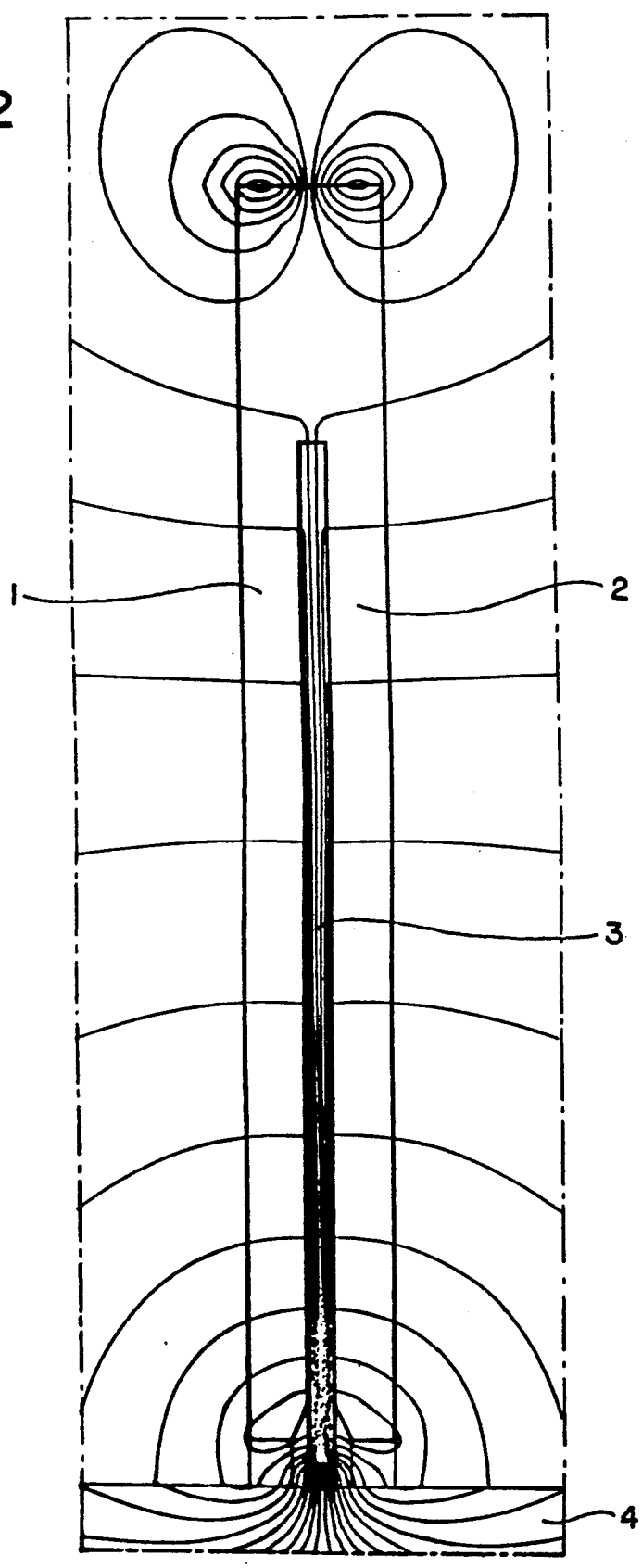

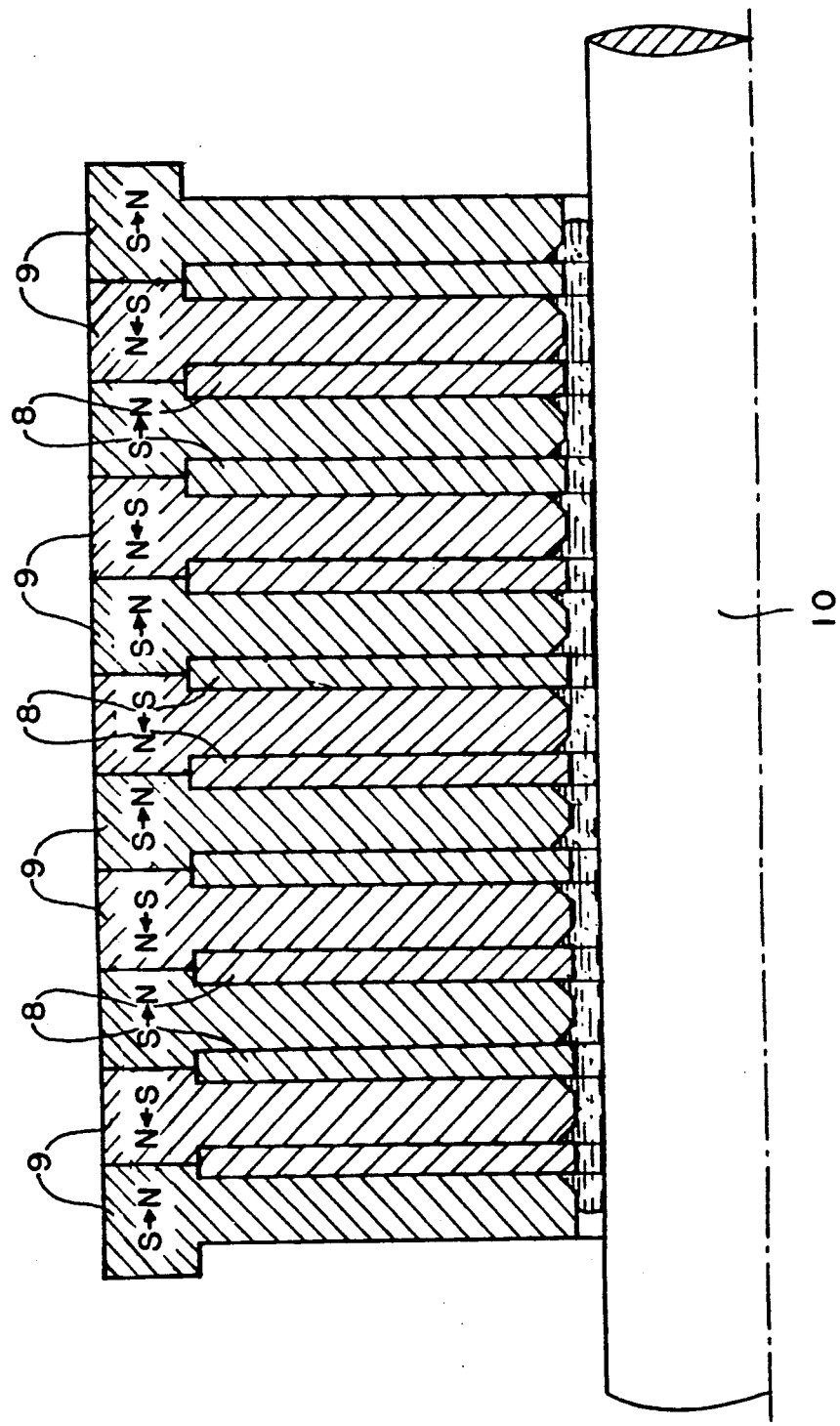

SEALING AND FRICTION BEARING UNIT CONTAINING A MAGNETIC FLUID

FIELD OF THE INVENTION

The present invention relates to a sealing and friction bearing unit containing a magnetic fluid.

BACKGROUND OF THE INVENTION

Devices for holding an amount of magnetic fluid by means of a magnetic field inside a gap-shaped space located around a rotatable shaft have been proposed. They include a unit consisting of an annular pole piece whose inner circumferential plane is located a relatively short distance from the shaft. These devices include at least one annular permanent magnet for generating the magnetic field, whereby the magnetic fluid is kept inside the gap-shaped space formed between this unit and the shaft. A similar device in the shape of a sealing unit is disclosed in European Patent Application 0182656.

This prior art unit includes one annular permanent magnet located around the shaft and, located on either side of this magnet, two pole pieces each of which, together with the shaft, form an annular sealing gap in which an amount of magnetic fluid is held by the magnetic field of the magnet. This means that the known unit is relatively complicated because of the presence of two sealing gaps.

Although the publication mentioned states that at least one pole piece is required, a similar unit with only one pole piece has not been at all adequate in practice because the asymmetrical design of the unit the magnetic field inside the sealing gap is not capable of keeping the magnetic fluid inside the gap under all circumstances. These prior art units are inoperative in some circumstances.

Accordingly, an object of the present invention is to create an improved bearing unit of the type mentioned with a considerably simpler design. Other objects will appear hereinafter.

SUMMARY OF THE INVENTION

It has now been discovered that the objects of the present invention can be achieved by the following device. Specifically, it has been discovered that, according to the present invention, the pole piece is located between two annular permanent magnets. The analogous poles of these magnets are directed at each other. The inner circumferential planes of the two magnets are located essentially equidistant from the shaft in order to form, together with the shaft, two annular spaces which are located on both sides of an annular intermediate gap.

Accordingly, in a device executed in this manner there is only one pole piece and, as a result, only one gap containing magnetic fluid, so that the unit is fairly simple in design. The magnetic fields generated by the two permanent magnets are concentrated radially inward toward the shaft so that the gradient of the magnetic flux is aimed at the cardioid of the pole piece. Thereby the amount of magnetic fluid in the aforementioned gap is strongly held. As a result, where the shaft is standing still, the magnetic flux in the gap may be sufficiently great to cause the magnetic particles suspended in the magnetic fluid to concentrate in an area between the pole piece and the shaft. This concentration of particles constitutes a type of membrane inside the magnetic fluid with a high concentration of magnetic particles. Increasing the magnetic conduction locally will result in a better sealing action because such a membrane is capable of absorbing great pressure differentials. When the shaft starts to rotate, the magnetic particles will again be distributed evenly over the magnetic fluid in response to flux lines.

Preferably, the inside corners facing the pole piece are bevelled at the inner circumferential planes of the permanent magnets.

In order to proven external radial losses at the outer circumferential plane of the pole piece, the outer circumferential plane of the pole piece is enclosed by the permanent magnets.

The device according to the invention may also be executed in the form of a friction bearing for the shaft, for which purpose the unit consisting of the two magnets and the pole piece is installed around the outer circumference of a bushing-shaped element which is located around the shaft with a relatively small annular intermediate space forming the aforementioned intermediate gap.

BRIEF DESCRIPTION OF THE DRAWINGS

These and other objects of the present invention and the various features and details of the operation and construction thereof are hereinafter more fully set forth with reference to the accompanying drawings, where:

FIG. 2 represents a diagram of flux lines of the magnetic force lines in a form of execution according to FIG. 1.

FIG. 4 shows a sequence of sealing units according to the invention.

DETAILED DESCRIPTION OF THE PREFERRED EMBODIMENT

Figure 1:
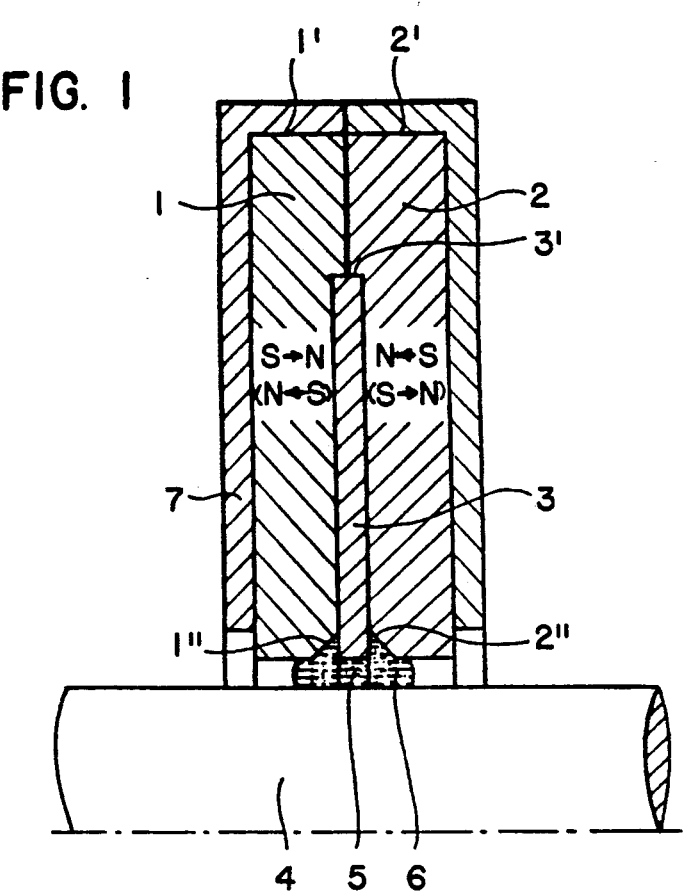
FIG. 1 represents a partially sectioned, elevational view of an embodiment of the device according to the invention in the form of a sealing unit.

As shown in FIG. 1, the sealing unit includes two annular permanent magnets 1 and 2 each having a north pole N and south pole Z. The analogous poles N-N or Z-Z are directed at each other as indicated in FIG. 1. A pole piece 3 is located between these permanent magnets 1 and 2 whose inner circumferential plane forms, together with the shaft 4, an annular sealing gap 5 which is filled with an amount of magnetic fluid 6 which is kept inside the sealing gap 5 by magnetic fields generated by the magnets 1 and 2.

As shown in FIG. 1, the outer circumferential plane 3' of the pole piece 3 is entirely enclosed by the magnets 1 and 2. However, this is not necessary because the outer circumferential plane 3' can also coincide with the outer circumferential planes 1' and 2' of the permanent magnets 1 and 2.

In addition, FIG. 1 shows that the entire unit is enclosed by a housing 7. However, the complete housing 7, too, is not necessary. It is acceptable that only part of the unit is enclosed by a housing.

Finally, FIG. 1 reveals that the inside corners of the permanent magnets 1 and 2 are bevelled as shown at 1" and 2".

FIG. 2 shows the course of the magnetic force lines in the form of execution according to FIG. 1. This figure reveals clearly that these force lines are concentrated toward the shaft 4.

Figure 3:
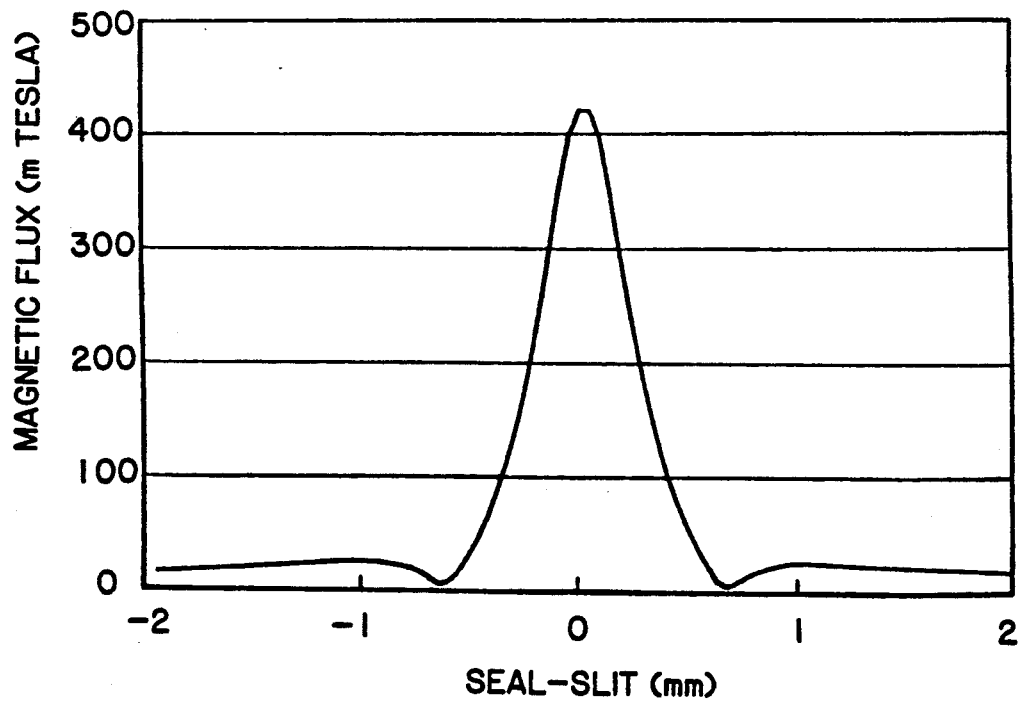
FIG. 3 represents graphically the course of the magnetic flux inside the sealing gap.

FIG. 3 shows that the magnetic flux increases greatly toward the middle of the sealing gap 5.

The entire unit, as shown in FIG. 1, may have a thickness of only 1 mm, whereby the pole piece has a thickness of 0.1 to 0.2 mm. This will still allow the generation of a strong magnetic flux of nearly 0.5 Tesla in the sealing gap.

The permanent magnets 1 and 2 may be made of any suitable material, e.g., ferrite, a synthetic material or rubber filled with ferrite, rare earth metals, etc.

Finally, FIG. 4 shows how a number of sealing units according to the invention may be interconnected to form a sealing unit for a shaft 10, consisting of a number n of annular pole pieces 8 and number (n+1) of permanent magnets 9. Again like poles N or Z are facing each other.

Figure 5:
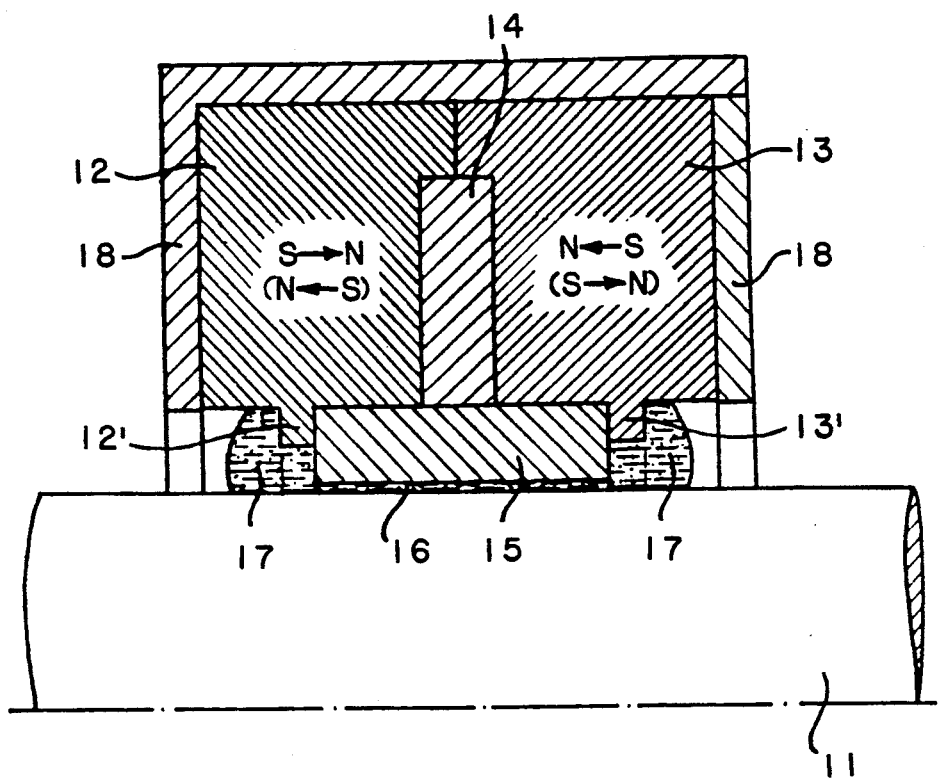
FIG. 5 represents an embodiment of the device accordingly to the invention in the form of a friction bearing.
Figure 6:
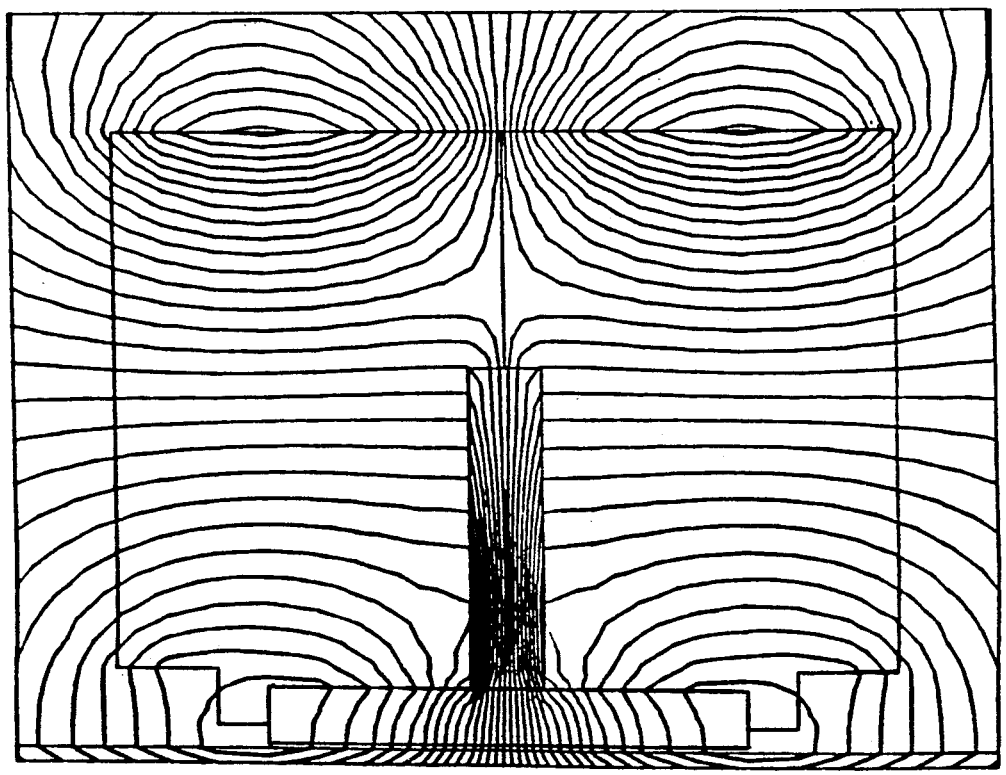
FIG. 6 shows the course of the magnetic force lines in the form of execution according to FIG. 5.

As shown in FIG. 5, the device includes two permanent magnets 12 and 13 in the form of a friction bearing for the shaft 11 whose analogous poles N or Z are direct at each other as indicated in this figure. A pole piece 14 extends between these permanent magnets 12 and 13, and is installed together with the magnets 12 and 13, around the outer circumference of a friction bearing bushing 15, whereby this bushing 15 is contained between the projecting shoulder 12' and 13' of, respectively, the magnets 12 and 13. The friction bearing bushing 15 surrounds the shaft 11 with a small clearance 16, whereby this clearance 16 is filled entirely with an amount of magnetic fluid 17 which is present on both sides of the clearance 16 in the annular spaces extending on both sides of the clearance 16. This amount of magnetic fluid 17 is being held by the magnetic fields generated by the magnets 12 and 13, whose magnetic force lines are shown in FIG. 6.

In this form of execution, too, the magnetic flux increases greatly toward the middle of the annular gap or clearance 16, more or less as shown in FIG. 3 for the form of execution according to FIG. 1.

As shown in FIG. 5, the outer circumferential plane of the pole piece 14 is entirely enclosed by the magnets 12 and 13. In this form of execution, too, this is not really necessary. The outer circumferential plane may coincide with the outer circumferential planes of the permanent magnets 12 and 13.

The entire unit is enclosed by a housing 18 which, however, is not totally necessary. In this form of execution, too, only part of the unit may be enclosed by a housing.

The entire unit, as shown in FIG. 5, may have a thickness of 5 mm whereby the pole piece has a thickness of 0.5 to 1.0 mm and the shaft of a diameter of 10 mm. A similar construction will generate a magnetic flux of $0.5 \pm 0.1$ Tesla at the inside diameter of the pole piece.

A friction bearing with a magnetic fluid as shown in FIG. 5 may be used in, e.g., spindles, electrical engines, etc., where little noise, high speed and low production costs are major requirements.

What is claimed is:

1. The combination comprising a shaft, a bearing bushing surrounding the shaft and spaced radially from the outer periphery of the shaft to define an annular gap and means for holding a quantity of magnetic fluid in the gap by means of a magnetic field comprising a pair of permanent magnets for generating a magnetic field circumscribing the bearing bushing and a pole piece located between said permanent magnets, said pole piece located adjacent the center of said annular gap which is of an axial length greater than the width of the pole piece, the analogous poles of said magnets being directed at each other and the inner circumferential planes of the two magnet is being located essentially equidistant from the shaft thereby producing a magnetic field concentrated radially inwardly toward the shaft whereby a magnetic fluid fills the annular gap and the annular spaces adjacent both axial ends of said gap.

2. The combination as claimed in claim 1 wherein the pole piece is of thickness between 0.1 to 0.2 mm and the shaft diameter is 10 mm thereby to generate a magnetic flux of about $0.5 \pm 0.1$ Tesla adjacent the inner diameter of the pole piece.

* * * * *